J. H. KIRTON.
Harvester-Rake.
No. 159,936.
Patented Feb. 16, 1875.
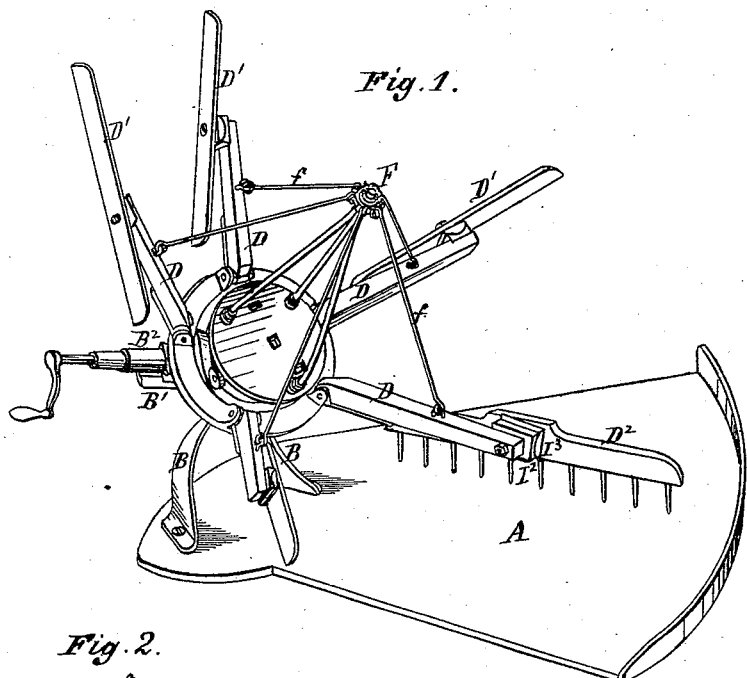
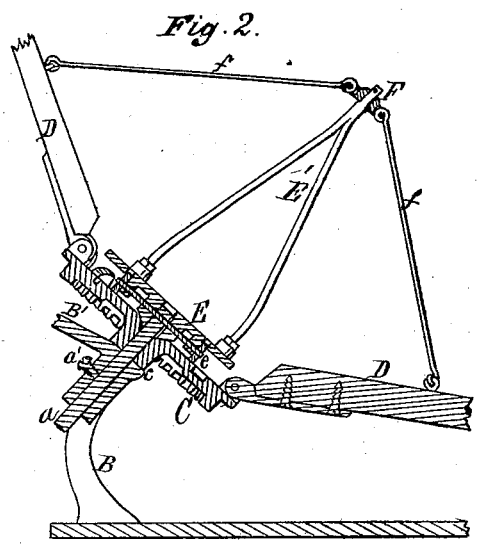
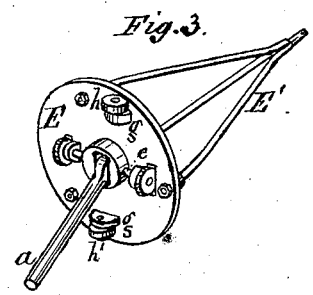
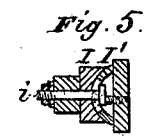
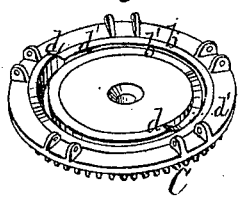
Witnesses
Alex Mahon
N. H. Doubleday
Inventor.
James H. Kirton
G. W. Ford Attorney
by S. M. Smith Associate

UNITED STATES PATENT OFFICE.

JAMES H. KIRTON, OF ROCKFORD, ILLINOIS.

IMPROVEMENT IN HARVESTER-RAKES.

Specification forming part of Letters Patent No. 159,986, dated February 16, 1875; application filed July 9, 1874.

*To all whom it may concern:*

Be it known that I, JAMES H. KIRTON, of Rockford, in the county of Winnebago and State of Illinois, have invented a new and useful Improvement in Harvester-Rakes; and I do hereby declare that the following is a full and exact description of the same, reference being had to the accompanying drawings, and to the letters of reference marked thereon.

Figure 1 represents a perspective view of my improved rake, taken from the outer front corner of the platform. Fig. 2 is a vertical transverse section through the same. Fig. 3 is a perspective view of the pivoted disk and tripod or brace to which the rake and reel-arms are linked, showing the lower face of the disk. Fig. 4 is a perspective view of the upper face of the bevel and cam wheel, and Fig. 5 represents a horizontal section through the plates which connect the reel-beaters with the carrying-arms; also, a vertical section through the plates connecting the rake-head with its carrying-arms.

Similar letters of reference denote corresponding parts wherever used.

The invention relates to that class of reel-rakes in which the reel-beaters and rake-head rotate about a common shaft or center, and in which the rake head or heads, in passing over the grain-platform, are made to move in a different path from that of the ordinary gatherers or reel-beaters, said path being in the arc of a horizontal circle, or one parallel with the platform, or thereabout, for removing the grain therefrom, and consists in the combination, with the crown or bevel wheel, to which the rake and reel-arms are hinged, and by means of which said arms are rotated, of a pivoted tripod or standard, to which said rake and reel arms are linked, in such manner that by the vibration of said standard or tripod the rake-head is made to pursue the different and independent path described. It further consists in devices for imparting the necessary vibrations to the pivoted standard or tripod for controlling its path, as described; and it further consists in a novel construction of the connecting-plates between the rake and reel heads or beaters and their carrying-arms, whereby the angle of the beaters or the pitch of the rake head and teeth may be adjusted or regulated, as the condition of the grain operated upon may require.

In the accompanying drawing, A represents the grain-platform, of the well-known circular or quadrant form in common use, said platform being designed to be connected with a machine of any known construction, in any usual or preferred manner. To the inner front corner of this platform, or to the shoe, finger-bar, or frame to which said platform is connected, is bolted a standard, B, said standard, in the present instance, being shown bifurcated or forked in such manner that it may, if desired, be made to stride the sickle-bar or its connecting-rod. The upper end of this standard is inclined outward, giving to its upper face a downward inclination outward, and is perforated to receive an inclined pivotal standard, $a$, held in place in, and in the desired relation to, said standard by a set-screw, $a'$. Upon this stationary pivot or shaft $a$ is mounted a crown or bevel wheel, C, the hub $c$ of which rests upon the inclined upper face of the standard B, and to lugs or ears on the upper face of this wheel C the rake and reel arms D are connected by horizontal pivots. Over this inclined bevel-wheel is a disk, E, lying substantially parallel with the upper face of the crown-wheel and pivoted to the upper end of the shaft $a$ by a pin, $e$, passing through a hub and lugs on the lower face of the disk, and through an eye formed in the upper end of shaft or standard $a$. This pivotal pin $e$ has friction-rollers mounted upon its ends, which rest upon the moving face of the rotating crown-wheel. Upon the upper face of the disk E is rigidly secured a standard, E', made, by preference, in the bracing form of a tripod, the arms being joined at the upper end and forming a pivotal support or shaft for a rotating disk or spider, F, which is connected by pivoted radial links $f$ with the respective rake and reel arms D, and revolves with said arms as the latter are rotated. Upon the upper face of the bevel-wheel is formed two circular concentric ways or tracks, $b\ b'$, one within the other, and each provided with a cam-shaped projection or prominence, $d$, and depression $d'$, these being arranged, the depression $d'$ in the one track being diametrically opposite the cam or prominence in the other, as shown. The under face of the disk E has lugs or ears $g$ formed upon it, provided with horizontal stub-axles or pins at right angles, or thereabout, to the pivot $e$, and upon these pins or stub-axles are placed friction-rollers $h\ h'$, arranged to travel one upon each of the concentric ways $b$ on the crown-wheel, the disk E, with its standard E', being held stationary, or prevented from rotating by its supporting-rod or shaft $a$, while the crown-wheel rotates, carrying the rake and reel arms with it. The wave-tracks $b\ b'$ are caused to pass under the friction-wheels $h\ h'$, which are so arranged relatively to the rake-arm as to tilt the disk E and cause the standard E' to gradually drop or incline toward the platform as the rake-head passes over the same, and to rise again to its normal position after the rake has discharged the grain, this drooping or depression of the upper end of the pivoted standard E' serving, through the connecting-links $f$, to give a corresponding depression to the rake-head for holding it down while it sweeps through a path parallel with the platform. The set-screw $a'$, which holds the pivotal standard or shaft $a$, permits said shaft and the tilting disk E, connected therewith, to be turned partly around for varying the path of the rake relatively to the platform. I $I^1$ are plates through which the beaters D' are connected with their carrying-arms D, said plates being made one concave and the other convex in transverse section, (see Fig. 5,) in such manner as to permit the beater-plate $I^1$ to roll slightly within the plate, as on a vertical pivot, for changing the angle of the reel-beater according as the position or inclination of the standing grain may require. Similar plates, $I^2\ I^3$, connect the rake head or heads with its carrying-arm, except that the adjacent faces of these plates are concave and convex in vertical section, so that the rake-head is adjusted as on a horizontal pivot for changing the pitch or angle of presentation of the teeth to the grain according to the condition of the grain, which, when fallen and matted, requires to be picked up and carried to the cutters and platform, and when standing erect requires only to be crowded back against the cutters and down upon the platform. The plates $I^1\ I^3$ are slotted to permit their adjustment, as explained, on the through bolts or screws $i$ connecting the parts. The standard B has formed upon or connected with it an arm or support, $B^1$, provided with bearings at $B^2$ for the shaft of the bevel-pinion, through which motion is imparted to the crown-wheel C for operating the rakes and reels from any convenient or suitable gearing on the main frame of the machine.

Having thus described my invention, what I claim as new, and desire to secure by Letters Patent, is—

1. The pivoted rocking plate or disk E, in combination with the pivoted rake and reel arms, whereby the rising and falling movements are imparted to said arms, substantially as described.

2. The combination of the bevel-wheel C, pivoted disk or table E, standard E', rotating disk F, and pivoted links $f$ with the arms of the reel and rake, substantially as and for the purpose set forth.

3. The plates connecting the reel-beaters and rake-head with their carrying-arms, made one concave the other convex on their adjacent faces for permitting the adjustment of the beaters and rake-head, as described.

This specification signed and witnessed this 27th day of June, 1874.

JAMES H. KIRTON.

Witnesses:
G. W. FORD,
CHARLIE S. FORD.